United States Patent
Delage

(10) Patent No.: US 11,450,444 B2
(45) Date of Patent: Sep. 20, 2022

(54) STORAGE BASKET FOR RADIOACTIVE MATERIALS, HAVING AN OPTIMISED SPACE REQUIREMENT AND HOUSINGS WITH MORE ACCURATE GEOMETRY

(71) Applicant: TN International, Montigney le Bretonneux (FR)

(72) Inventor: Olivier Delage, Les Clayes sous Bois (FR)

(73) Assignee: TN INTERNATIONAL, Montigney le Bretonneux (FR)

( * ) Notice: Subject to any disclaimer, the term of this patent is extended or adjusted under 35 U.S.C. 154(b) by 0 days.

(21) Appl. No.: 16/962,995

(22) PCT Filed: Jan. 21, 2019

(86) PCT No.: PCT/FR2019/050117
§ 371 (c)(1),
(2) Date: Jul. 17, 2020

(87) PCT Pub. No.: WO2019/145627
PCT Pub. Date: Aug. 1, 2019

(65) Prior Publication Data
US 2020/0350089 A1 Nov. 5, 2020

(30) Foreign Application Priority Data

Jan. 26, 2018 (FR) ...................................... 1850638

(51) Int. Cl.
*G21F 5/012* (2006.01)
*G21C 19/07* (2006.01)
(52) U.S. Cl.
CPC ............. *G21F 5/012* (2013.01); *G21C 19/07* (2013.01)

(58) Field of Classification Search
CPC . G21F 5/012; G21F 5/00; G21F 5/002; G21F 5/005; G21F 5/008; G21C 19/07; G21C 19/065; Y02E 30/00; Y02E 30/30
(Continued)

(56) References Cited

U.S. PATENT DOCUMENTS 4,356,062 A * 10/1982 Bosshard ............... G21C 19/07
250/507.1
5,550,882 A * 8/1996 Lehnert ................... G21F 5/008
376/272
(Continued)

FOREIGN PATENT DOCUMENTS

EP 1212755 A1 6/2002
FR 2813701 A1 3/2002
(Continued)

OTHER PUBLICATIONS

International Search Report for International Patent Application No. PCT/FR2019/050117 dated Apr. 12, 2019.
(Continued)

*Primary Examiner* — Darlene M Ritchie
(74) *Attorney, Agent, or Firm* — Pearne & Gordon LLP

(57) ABSTRACT

A storage basket for radioactive materials, defining housings parallel to each other and each extending along a housing axis parallel to a longitudinal central axis of the basket, the latter including: a plurality of transverse plates, traversed by a plurality of openings; a plurality of housing tubes arranged parallel to the longitudinal central axis of the basket. The housing tubes are arranged in alternation with the transverse plates along the axis, such that the inner lateral surface of each housing is defined, successively along this axis, at least by the inner surface of a first housing tube, the inner surface of one of the openings of a first transverse plate, and the inner surface of a second housing tube.

17 Claims, 3 Drawing Sheets

(58) Field of Classification Search
USPC ........................................................ 376/272
See application file for complete search history.

(56) References Cited

U.S. PATENT DOCUMENTS

| | | |
|---|---|---|
| 2016/0372224 A1 | 12/2016 | Singh et al. |
| 2017/0229199 A1 | 8/2017 | Delage et al. |
| 2018/0025796 A1* | 1/2018 | Singh .................... G21C 19/07 376/272 |
| 2018/0350476 A1 | 12/2018 | Delage et al. |

FOREIGN PATENT DOCUMENTS

| | | | |
|---|---|---|---|
| FR | 2992092 A1 | 12/2013 | |
| WO | 0219343 A1 | 3/2002 | |
| WO | WO-0219343 A1 * | 3/2002 | ............. G21F 5/012 |

OTHER PUBLICATIONS

Written Opinion for International Patent Application No. PCT/FR2019/050117 dated Apr. 12, 2019.
Search Report issued in French Patent Application No. 1850638 dated Sep. 20, 2018.

* cited by examiner

STORAGE BASKET FOR RADIOACTIVE MATERIALS, HAVING AN OPTIMISED SPACE REQUIREMENT AND HOUSINGS WITH MORE ACCURATE GEOMETRY

This is the National Stage of PCT international application PCT/FR2019/050117, filed on Jan. 21, 2019 entitled "STORAGE BASKET FOR RADIOACTIVE MATERIALS, HAVING AN OPTIMISED SPACE REQUIREMENT AND HOUSINGS WITH MORE ACCURATE GEOMETRY", which claims the priority of French Patent Application No. 1850638 filed Jan. 26, 2018, both of which are incorporated herein by reference in their entirety.

TECHNICAL FIELD

The present invention relates to the field of transport and/or warehousing of radioactive materials. For example these can be assemblies of fresh or irradiated fuels, or radioactive waste.

STATE OF PRIOR ART

A basket, also called a storage "device" or "rack", comprises a plurality of adjacent housings each able to receive radioactive materials. It is housed into the containment enclosure of a packaging, and designed to be able to simultaneously fulfil three essential functions, which will be briefly set out below.

Indeed, there is first the function of thermal transfer of heat released by radioactive materials. Generally, aluminium or one of its alloys, due to its good thermal conduction properties, is used.

The second function relates to neutron absorption, and the issue of maintaining the sub-criticality of the storage basket when the latter is loaded with fissile radioactive materials. This is made by using neutron absorbing materials, such as boron.

Finally, the third essential function is concerned with the mechanical strength of the device. It is noted that the overall mechanical strength of the basket has to be compatible with regulatory safety requirements for transporting/warehousing radioactive materials, especially regarding tests called "free drop" tests.

Many technical solutions are already known to make such baskets. For example, it has been contemplated to provide tubes arranged in parallel and each forming a housing for receiving radioactive materials. In this case, for example disclosed in document EP 1 212 755 A1, tubes are held to each other by transverse plates spaced apart from each other along the longitudinal central axis of the basket. To do so, each of these plates has tubes passing therethrough at through holes. However, a minimum material thickness has to be kept between two directly consecutive through holes within a same plate, in order to fulfil the aforesaid mechanical strength function. It generates a substantial transverse overall size for the basket.

Furthermore, tubes generally extend over the whole height of the basket. It makes it difficult to obtain an accurate geometry of the housing, over the whole length of the latter. It is particularly complicated and expensive to reach the desired straightness over the whole length of the housing.

DISCLOSURE OF THE INVENTION

The purpose of the invention is therefore to at least partially overcome the abovementioned drawbacks, relating to embodiments of prior art.

To do so, one object of the invention is a storage basket for radioactive materials, the basket being to be arranged into a containment enclosure of a packaging for transporting and/or warehousing radioactive materials, the basket defining a plurality of housings each for receiving radioactive materials, the housings being parallel to each other and each extending along a housing axis parallel to a longitudinal central axis of the basket, the latter including:

- a transverse plate or a plurality of transverse plates distributed along the longitudinal central axis of the basket and arranged orthogonally to this axis, each plate having a plurality of holes passing therethrough;
- a plurality of housing tubes arranged parallel to the longitudinal central axis of the basket.

According to the invention, the housing tubes are arranged alternately with the transverse plate(s) along the longitudinal central axis, so that the inner side surface of each housing is defined, successively along this axis, at least by the inner surface of a first housing tube, the inner surface of one of the holes of a first transverse plate, and the inner surface of a second housing tube.

By means of this segmented design of housings along the longitudinal direction of the basket, it becomes easier to obtain the desired straightness over the whole length of these housings. Furthermore, since the holes of the transverse plates now form an integral part of the housings, these holes can thus be brought closer to each other while keeping the minimum material thickness required to fulfil the mechanical strength function. As a result the transverse overall size of the basket is advantageously decreased.

The invention furthermore has at least any of the following optional characteristics, taken alone or in combination.

The transverse plate(s) each comprise, at both their opposite faces, means for holding the housing tubes.

These holding means preferably take the shape of recesses into which the ends of the housing tubes are inserted.

The inner side surface of each housing has a circular, square, rectangular or hexagonal-shaped cross-section, or any other shape deemed to be appropriate by those skilled in the art.

The transverse plate(s) each have a disc shape.

Each housing tube is made of a steel preferably devoid of neutron absorbing elements, and each housing tube forms an inner tube surrounded by an outer tube made of an aluminium alloy preferably comprising neutron absorbing elements such as boron.

Each inner tube axially projects from each of both opposite ends of the outer tube.

The transverse plate(s) is (are) made of steel.

The basket also includes a top plate and a bottom plate sandwiching between each other the alternating transverse plate(s) and housing tubes.

The basket also includes tie rods each passing through the top plate, the bottom plate, as well as the transverse plate(s).

Each housing is defined using a number N of transverse plate(s), number N being between 1 and 20.

A ratio of the length of any of the housing tubes to the thickness of the plate or of any of the transverse plates is between 3 and 15.

The length of the housing tubes is between 20 and 70 cm.

Finally, one object of the invention is a packaging for transporting and/or warehousing radioactive materials, the packaging comprising a containment cavity delimited by a side body, a bottom and a lid, the packaging being fitted with a storage basket such as described above, arranged into the containment enclosure.

Further advantages and characteristics of the invention will appear in the non-limiting detailed description hereinbelow.

BRIEF DESCRIPTION OF THE DRAWINGS

This description will be made with respect to the appended drawings among which.

DETAILED DISCLOSURE OF PREFERRED EMBODIMENTS

Figure 1:
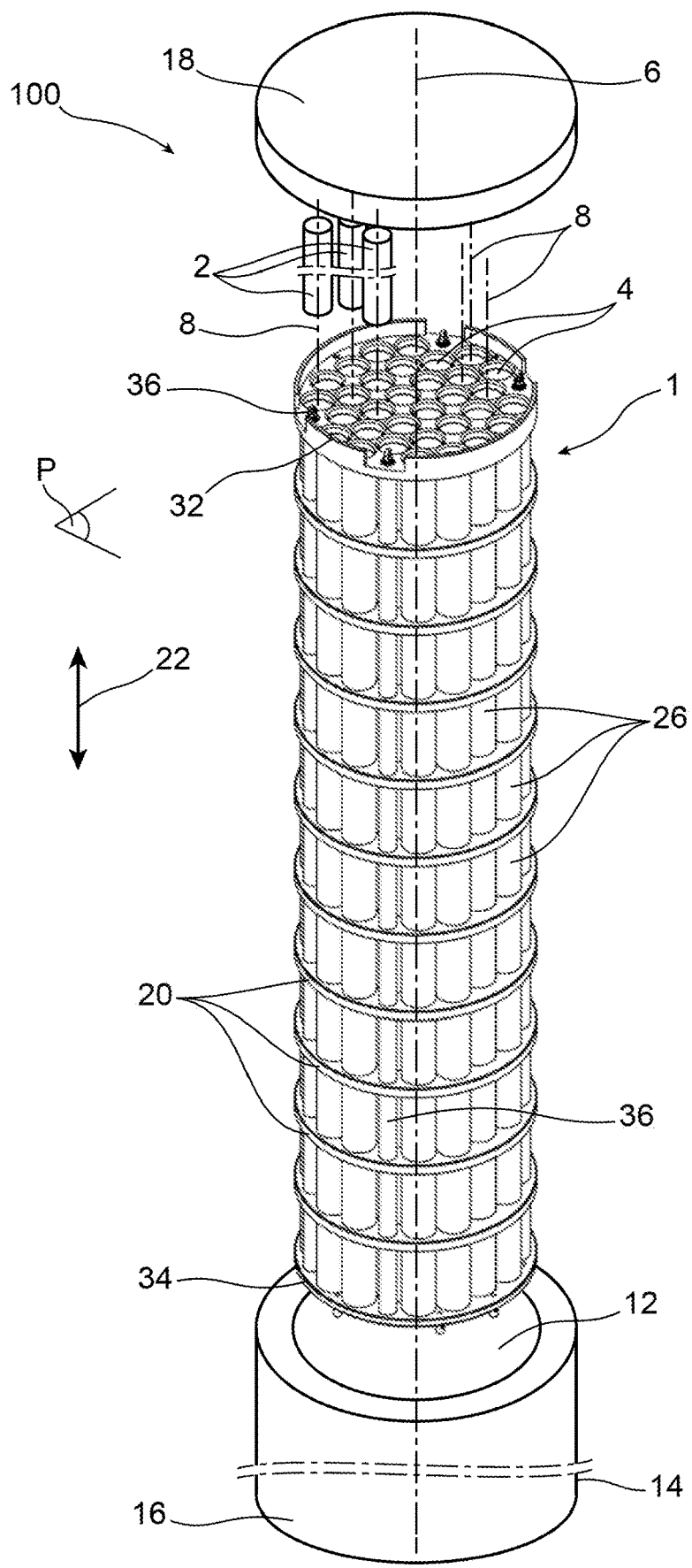
FIG. 1 represents a packaging for transporting and/or warehousing radioactive materials, in an exploded perspective view, according to a preferred embodiment of the invention.

First with reference to FIG. 1, a packaging 100 for transporting and/or warehousing radioactive materials according to a preferred embodiment of the invention is represented. This packaging 100 includes a storage basket 1 in which radioactive materials 2 are to be stored, into housings 4 adjacent and parallel to a longitudinal central axis 6 of the basket. Also, each housing 4 has a housing axis 8 parallel to the central axis 6 of the basket 1, corresponding to the longitudinal central axis of the packaging.

The packaging 100 defines a containment enclosure 12 in which the basket 1 is to be housed. Conventionally, the packaging is formed by an outer side body 14, a fixed bottom 16 and a removable lid 18 closing the enclosure 12. When the basket of the packaging is loaded with radioactive materials 2, the whole is conventionally called "package".

The storage basket 1 has a generally cylindrical-shaped axis 6, and with a circular cross-section complementary to that of the enclosure 12. The housings 4 also have a preferentially circular cylindrical-shaped cross-section, but which could alternatively be square, rectangular or even hexagonal, in order to accommodate the shape of the radioactive contents received in the housings 4. The aforesaid shape of the housings corresponds to their inner surfaces 4a, referenced 2 and 3 in the figures.

By way of indication, it is noted that the number of housings 4 provided on the basket 1 is high, for example greater than 10. In the example represented in the figures, 32 housings are defined by the basket 1, each of these housings receiving radioactive materials 2 such as assemblies of fresh or irradiated fuels, or radioactive waste.

Figure 2:
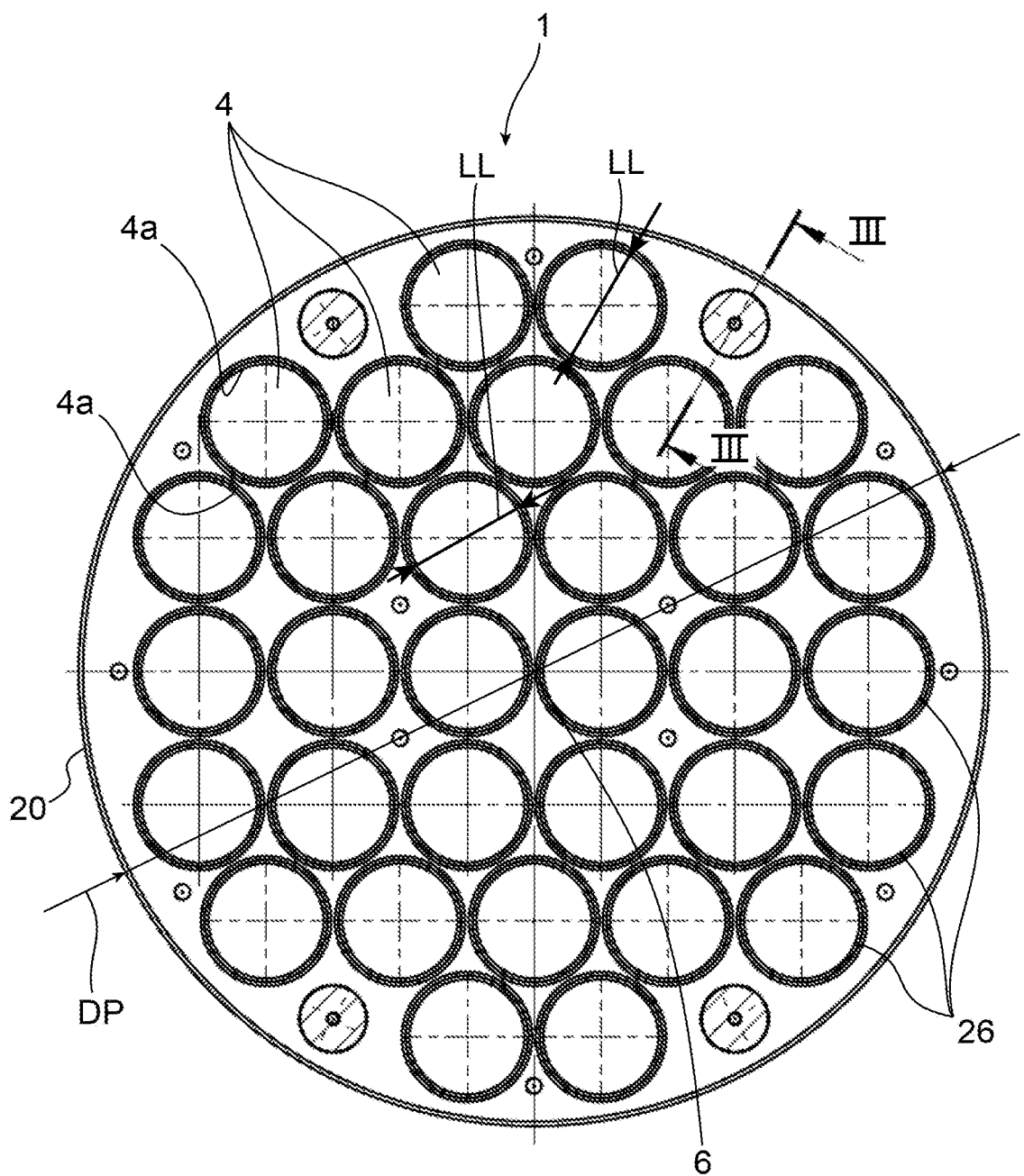
FIG. 2 represents a cross-section view of the storage basket fitting out the packaging of FIG. 1, along a section plane P of this same figure.

The greatest width of each housing, referenced "LL" in FIG. 2 and corresponding to the internal diameter of each of these housings, is such that it has a low variable with respect to the external diameter of the basket referenced "DP". More precisely, the ratio between dimensions LL and DP is lower than or equal to 0.2, which indeed reflects the presence of a high number of housings 4 within the basket.

The basket 1 is made using various elements, among which at least one transverse plate 20, and preferably several transverse plates 20 spaced apart from each other along a longitudinal direction 22 of the basket, parallel to its longitudinal central axis 6. These transverse plates 20, also called slugs, are thus oriented transversally within the basket, that is arranged orthogonally to plane P and axes 6, 8. They are preferably made of steel, and each are generally of a disc shape perforated with a plurality of holes 24, the number of which corresponds to the total number of housings 4 within the basket.

Between the plates 20, the basket 1 includes housing tubes 26 arranged parallel to the longitudinal central axis 6 of the basket. Much like the plates 20, the circular section tubes 26 are made of a steel, preferably devoid of neutron absorbing elements, such as a stainless steel. In this respect, it is indicated that by "neutron absorbing elements", it is meant elements which have a cross-section area greater than 100 barns for thermal neutrons. However, in the embodiment represented, each housing tube 26 forms an internal tube surrounded by an external tube 26a made in turn of a material comprising neutron absorbing elements, such as an aluminium alloy comprising boron, gadolinium, hafnium, cadmium, or even indium. A very small radial clearance is provided between both coaxial tubes 26, 26a of each pair, since only one assembly clearance can indeed be kept.

Figure 3:
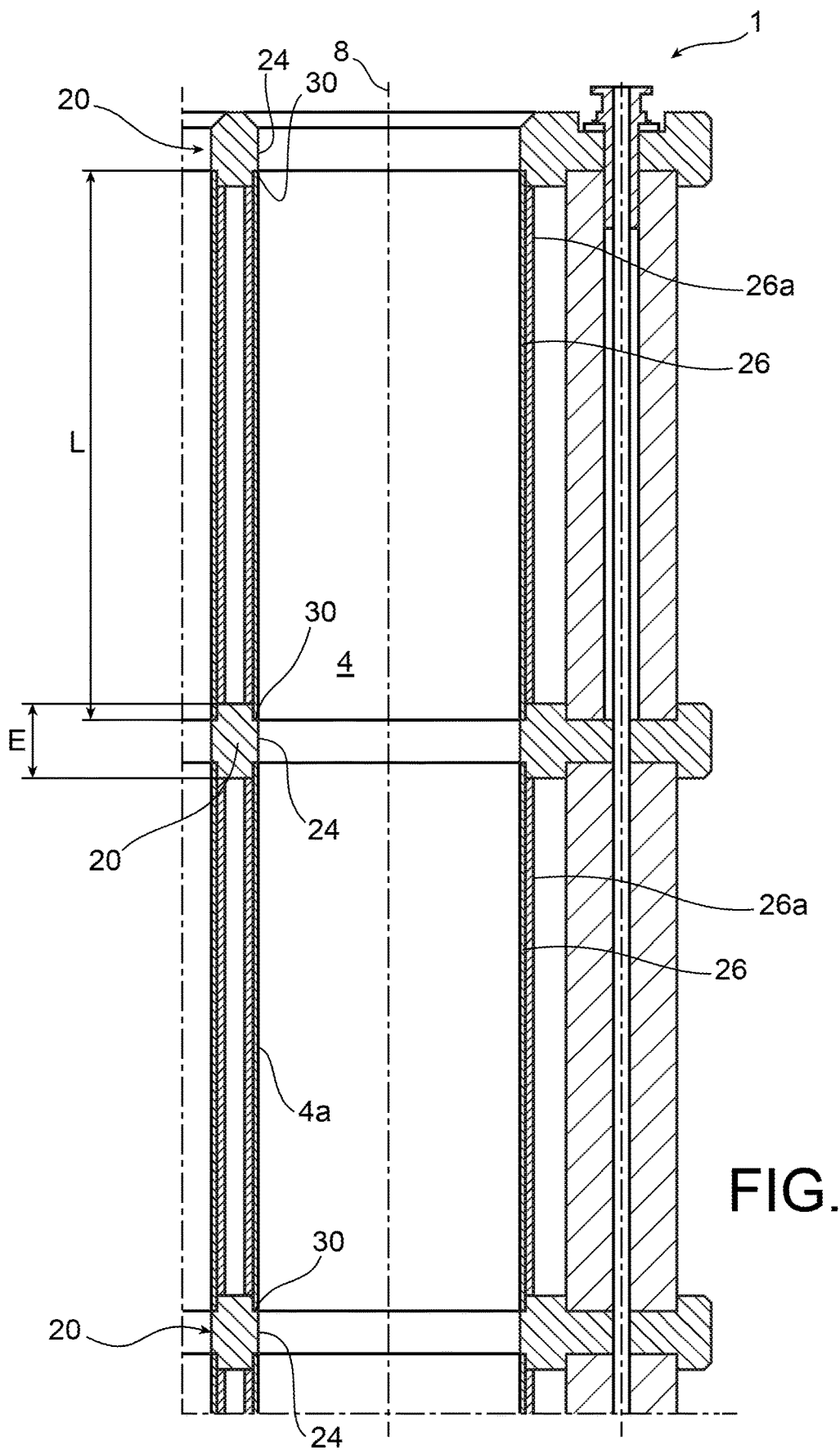
FIG. 3 represents a cross-section view taken along line III-III of FIG. 2.

More precisely, two tubes 26 are associated with each hole 24 of each transverse plate 20, by being disposed on either side of the hole in question. One of the features of the invention lies indeed in forming housings 4 by associating housing tubes 26, and holes 24 passing through the plates 20. Since the transverse plates 20 and the housing tubes 26 are arranged alternately along the direction 22, the inner side surface 4a of each housing 4 is thus successively defined by the inner surface of a first housing tube 26, the inner surface of one of the holes of a first transverse plate 20, and the inner surface of a second housing tube 26, the inner surface of one of the holes of a second transverse plate 20, and so on. It is noted that the number of transverse plates is between 1 and 20, and preferentially between 5 and 15. Of course, this number depends on the height of the basket. The tubes 26 are then provided in a similar number, by having a length in the order of 20 to 70 cm. This length "L" depicted in FIG. 3 is greater than thickness "E" of the plates 20, since the ratio of the length L of any of the housing tubes 26, to the thickness E of any of the transverse plates 20, is between 3 and 15. The thickness E of the plate 20 is here considered in its current zone between the holes 24, at a distance from the periphery of the same which has a recess leading to a local reduction in the thickness.

This recess forms a socket 30 which acts as holding means for the housing tube 26, an end of which is inserted into this socket. The external surface of the tube 26 is indeed guided by the side wall of the socket 30, whereas the bottom thereof forms a shoulder on which the tube 26 comes in axial abutment. Each hole 24 is thus fitted with two sockets 30 respectively provided on both opposite faces of the associated transverse plate 20, in order to hold both corresponding tubes 26.

Preferably, only the steel housing tube 26 penetrates the socket 30, and not the associated external tube 26a. To do so, each tube 26 axially projects from each of both opposite ends of the external tube 26a, these ends resting in turn on the current part of the plate 20, having thickness E.

Finally, it is noted that the basket 1 also comprises a top plate 32 and a bottom plate 34, sandwiching between each other the alternating transverse plates 20 and housing tubes 26. These plates 32, 34 also have holes for passing radioactive materials therethrough. They are connected to each other by tie rods 36 which pass therethrough, and which also pass through each transverse plate 20 at the periphery of the basket.

By means of this design, the mechanical function is ensured by the tubes 26, plates 20 and tie rods 36 together, whereas the sub-criticality function is ensured by the external tubes 26a.

Moreover, the segmented design of the housings 4 along the longitudinal direction 22 enables the desired straightness to be obtained, over the whole length thereof. And since the holes 24 of the plates 20 are an integral part of the housings, these holes can be brought closer to each other while keeping between each other a minimum material thickness in order to fulfil the mechanical strength function. As a result, the transverse overall size of the basket 1 is advantageously decreased.

Of course, various modifications can be brought by those skilled in the art to the storage basket 1 and the packaging 100 just described, solely by way of indicating examples and within the scope defined by the appended claims.

What is claimed is:

1. A storage basket for radioactive materials, the basket configured to be arranged into a containment enclosure of a packaging for transporting and/or warehousing radioactive materials, the basket defining a plurality of housings each for receiving radioactive materials, the housings being parallel to each other and each extending along a housing axis parallel to a longitudinal central axis of the basket, the latter including:
   a transverse plate or a plurality of transverse plates distributed along the longitudinal central axis of the basket and arranged orthogonally to the longitudinal central axis, each plate having a plurality of holes passing therethrough;
   a plurality of housing tubes arranged parallel to the longitudinal central axis of the basket,
   wherein the housing tubes are arranged alternately with the transverse plate(s) along the longitudinal central axis, so that an inner side surface of each housing is defined, successively along the longitudinal central axis, at least by an inner surface of a first housing tube, an inner surface of one of the holes of a first transverse plate, and an inner surface of a second housing tube, and
   wherein the respective inner surfaces of the first and second housing tubes are flush with the inner surface of said one of the holes of the first transverse plate such that a cross-sectional shape of the inner side surface of each said housing remains constant along the housing axis.

2. The basket according to claim 1, wherein the cross-sectional shape of the inner side surface of each said housing is a circle, square, rectangle, or hexagon.

3. The basket according to claim 1, wherein the transverse plate(s) each have a disc shape.

4. The basket according to claim 1, wherein the transverse plate(s) are made of steel.

5. The basket according to claim 1, wherein each housing is defined using a number N of transverse plate(s), number N being between 1 and 20.

6. The basket according to claim 1, wherein a ratio of a length (L) of any of the housing tubes to a thickness (E) of the transverse plate or one of the plurality of transverse plates is between 3 and 15.

7. The basket according to claim 1, wherein a length of the housing tubes is between 20 and 70 cm.

8. A packaging for transporting and/or warehousing radioactive materials, the packaging comprising a containment enclosure delimited by a side body, a bottom and a lid, the packaging being fitted with a storage basket according to claim 1, arranged into the containment enclosure.

9. The basket according to claim 1, wherein the transverse plate(s) each comprise, at both opposite faces whose normal is directed along the longitudinal axis, means for holding the housing tubes.

10. The basket according to claim 9, wherein the holding means take the shape of sockets into which the ends of the housing tubes are inserted.

11. The basket according to claim 1, wherein each housing tube is made of a steel, and in that each housing tube forms an internal tube surrounded by an external tube made of an aluminium alloy.

12. The basket according to claim 11, wherein each internal tube axially projects from each of both opposite ends of the external tube.

13. The basket according to claim 11, wherein the steel is devoid of neutron absorbing elements, and wherein the aluminium alloy comprises neutron absorbing elements.

14. The basket according to claim 13, wherein the neutron absorbing elements are boron.

15. The basket according to claim 1, also including a top plate and a bottom plate sandwiching between each other the alternating transverse plate(s) and housing tubes.

16. The basket according to claim 15, also including tie rods each passing through the top plate, the bottom plate, as well as the transverse plate(s).

17. A storage basket for radioactive materials, the basket configured to be arranged into a containment enclosure of a packaging for transporting and/or warehousing radioactive materials, the basket defining a plurality of housings each for receiving radioactive materials, the housings being parallel to each other and each extending along a housing axis parallel to a longitudinal central axis of the basket, the latter including:
   a transverse plate or a plurality of transverse plates distributed along the longitudinal central axis of the basket and arranged orthogonally to the longitudinal central axis, each plate having a plurality of holes passing therethrough;
   a plurality of housing tubes arranged parallel to the longitudinal central axis of the basket,
   wherein the housing tubes are arranged alternately with the transverse plate(s) along the longitudinal central axis, so that an inner side surface of each housing is defined, successively along the longitudinal central axis, at least by an inner surface of a first housing tube, an inner surface of one of the holes of a first transverse plate, and an inner surface of a second housing tube,
   and wherein the transverse plate(s) each comprise, at both opposite faces whose normal is directed along the longitudinal axis, sockets into which corresponding ends of the housing tubes are inserted.

* * * * *